(12) United States Patent
Ho et al.

(10) Patent No.: US 7,995,543 B2
(45) Date of Patent: Aug. 9, 2011

(54) NETWORK DEVICE FOR IMPLEMENTING MULTIPLE ACCESS POINTS AND MULTIPLE CLIENT STATIONS

(75) Inventors: Ken Kinwah Ho, San Jose, CA (US); Tam Tran, San Ramon, CA (US); Chia-Chun Chung, San Jose, CA (US); Timothy J. Donovan, Livermore, CA (US); Sonali Bagchi, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 1255 days.

(21) Appl. No.: 11/429,633

(22) Filed: May 5, 2006

(65) Prior Publication Data
US 2007/0258397 A1 Nov. 8, 2007

(51) Int. Cl.
*H04W 4/00* (2009.01)
(52) U.S. Cl. .................................. 370/338; 370/328
(58) Field of Classification Search .................. None
See application file for complete search history.

(56) References Cited

U.S. PATENT DOCUMENTS

| | | | |
|---|---|---|---|
| 5,742,604 A | 4/1998 | Edsall et al. | |
| 5,912,891 A | 6/1999 | Kanai | |
| 6,636,499 B1 | 10/2003 | Dowling | |
| 6,744,783 B1 | 6/2004 | Tzeng | |
| 6,980,547 B1 | 12/2005 | Gally et al. | |
| 7,251,217 B2 | 7/2007 | Wong et al. | |
| 7,420,527 B2 | 9/2008 | Sato et al. | |
| 7,797,016 B2 * | 9/2010 | Eran et al. | 455/525 |
| 2002/0197984 A1 | 12/2002 | Monin et al. | |
| 2003/0227893 A1 | 12/2003 | Bajic | |
| 2005/0122966 A1 | 6/2005 | Bowes | |
| 2005/0174962 A1 * | 8/2005 | Gurevich | 370/328 |
| 2006/0153085 A1 * | 7/2006 | Willins et al. | 370/242 |
| 2007/0195727 A1 * | 8/2007 | Kinder et al. | 370/328 |

FOREIGN PATENT DOCUMENTS

WO   WO 96/015608   5/1996

OTHER PUBLICATIONS 802.11n; IEEE P802.11-04/0889r6; Wireless LANs, TGn Sync Proposal Technical Specification; 131 pages, May 18, 2005.
IEEE Std 802.16/2004 (Revision of IEEE Std 802.16/2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

(Continued)

*Primary Examiner* — Rafael Pérez-Gutiérrez
*Assistant Examiner* — German Viana Di Prisco

(57) ABSTRACT

A wireless network device includes N access point (AP) modules having N BSSID's, where N is an integer greater than 1. The wireless network device includes a control module that communicates with the N AP modules. The control module stores the N BSSID's, a BSSID of an $(N+1)^{th}$ external AP that communicates with M client stations, and at least one MAC address of at least one of the M client stations, where M is an integer greater than or equal to 1. The control module communicates with the $(N+1)^{th}$ external AP by emulating at least one of the M client stations.

40 Claims, 15 Drawing Sheets

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

IEEE Std 802.11a-1999 (Supplement to IEEE Std 802.11-1999) [Adopted by ISO/IEC and redesignated as ISO/IEC 8802-11: 1999/ Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11g/D2.8, May 2002 (Supplement to ANSI/IEEE Std 802.11, 1999 Edition) Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band; LAN/MAN Standards Committee of the IEEE Computer Society; 53 pages.

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 24 pages.

* cited by examiner

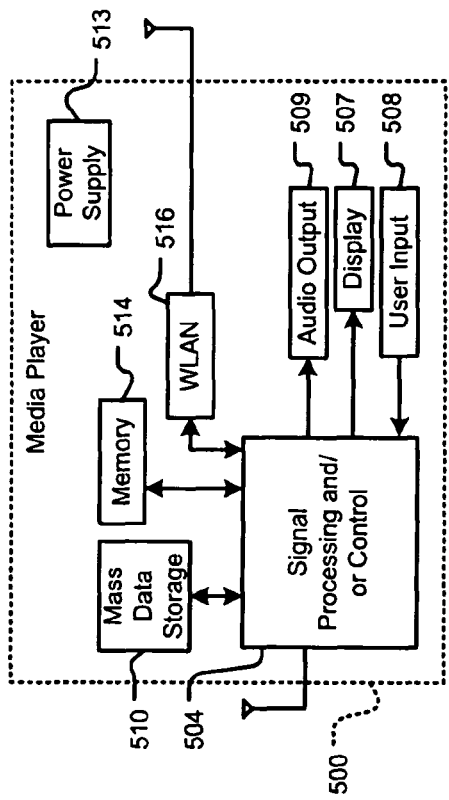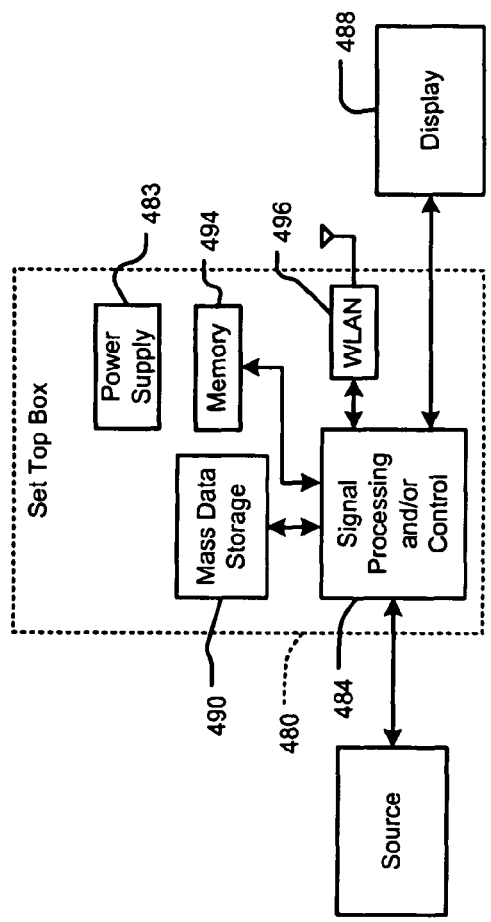

NETWORK DEVICE FOR IMPLEMENTING MULTIPLE ACCESS POINTS AND MULTIPLE CLIENT STATIONS

FIELD OF THE INVENTION

The present invention relates to wireless networks, and more particularly to simultaneously implementing multiple access points and multiple client stations in a single network device.

BACKGROUND OF THE INVENTION

IEEE sections 802.11, 802.11(a), 802.11(b), 802.11(g), 802.11(h), 802.11(n), 802.16, 802.20, which are hereby incorporated by reference, define ways for configuring wireless Ethernet networks and devices. According to these standards, a wireless Ethernet network device may operate in either an ad-hoc mode or an infrastructure mode. In the ad-hoc mode, as shown in FIG. 1, each client station 10-1, 10-2, . . . , and 10-N (collectively client stations 10) communicates directly with other client stations without requiring an access point (AP). In the infrastructure mode, as shown in FIG. 2, each client station 20-1, 20-2, . . . , and 20-M (collectively client stations 20) communicates with other client stations through an AP 24. The AP 24 may provide a connection to a network 26, a server 28, and for the Internet 30.

In the infrastructure mode, the AP 24 and the client station(s) 20 that use the AP 24 constitute a basic service set or BSS. A wireless Ethernet network can comprise multiple BSS's. Each BSS is identified by a unique identifier for the AP in the BSS, called a BSSID. An AP transmits a beacon, that is, a packet or a frame of information, to inform the client stations in the BSS that the AP is ready to communicate with the client stations. A beacon includes the BSSID, a beacon interval, and a delivery traffic indication message (DTIM).

A beacon interval specifies the period of time between scheduled beacons. Based on the beacon interval, the client stations can determine the duration of time that they can sleep, or wait in low-power mode, before waking up to handle the next beacon and either receive the data from or transmit the data to the AP. The beacon intervals are programmable. The DTIM in a beacon contains a DTIM count and a DTIM period. The DTIM count indicates the number of beacon intervals prior to the next DTIM beacon and the DTIM period indicates the number of beacon intervals between successive DTIMs.

An AP schedules a beacon for transmission at a target beacon transmission time (TBTT). Immediately following a beacon transmission of type DTIM, the AP transmits the broadcast and multicast frames to client stations using normal transmission rules.

FIG. 3 shows a typical system on chip (SOC) circuit 40 that can be used to implement a wireless Ethernet network device, that is, a client station and/or an AP. The SOC 40 generally includes one or more processors 42, such as an advanced RISC machine or ARM processor; a medium access controller (MAC) device 44; a baseband processor (BBP) 46; and a host interface, such as a peripheral component interface (PCI) (not shown). Additionally, the SOC 40 may include a radio frequency (RF) transceiver 48 or the transceiver may be located externally.

SUMMARY OF THE INVENTION

A wireless network device comprises N access point (AP) modules having N BSSID's, where N is an integer greater than 1. The wireless network device comprises a control module that communicates with the N AP modules, that stores the N BSSID's, a BSSID of an $(N+1)^{th}$ external AP that communicates with M client stations, and at least one MAC address of at least one of the M client stations, where M is an integer greater than or equal to 1, and that communicates with the $(N+1)^{th}$ external AP by emulating at least one of the M client stations.

In another feature, the control module receives a frame from a client station that communicates with one of the N AP modules, and selectively transmits the frame to the $(N+1)^{th}$ external AP based on data in the frame, the N BSSID's, the BSSID of the $(N+1)^{th}$ external AP, and at least one MAC address of at least one of the M client stations, wherein the wireless network device communicates with the $(N+1)^{th}$ external AP as at least one of the M client stations.

In another feature, the control module transmits the frame to a client station that communicates with one of the N AP modules based on data in the frame, the N BSSID's, the BSSID of the $(N+1)^{th}$ external AP, and at least one MAC address of at least one of the M client stations.

In another feature, the control module receives a frame from the $(N+1)^{th}$ external AP and transmits the frame to a client station that communicates with one of the N AP modules based on data in the frame, the N BSSID's, the BSSID of the $(N+1)^{th}$ external AP, and at least one MAC address of at least one of the M client stations, wherein the wireless network device communicates with the $(N+1)^{th}$ external AP as at least one of the M client stations.

In another feature, the wireless network device further comprises a baseband processor that communicates with the N AP modules and the control module. The wireless network device further comprises a radio frequency (RF) transceiver that communicates with the baseband processor.

In another feature, the control module comprises a transmit module that generates a plurality of target beacon transmission time (TBTT) pulse trains based on predetermined beacon intervals and predetermined DTIM periods. The TBTT pulse trains trigger the N AP modules that transmit beacons having beacon intervals proportional to N. The beacons are staggered and non-overlapping.

In another feature, the control module comprises a receive module that receives frames, compares MAC addresses in the frames with the N BSSID's, the BSSID of the $(N+1)^{th}$ external AP, and at least one MAC address of at least one of the M client stations, and selectively routes the frames to one of one of the N AP modules and at least one of the M client stations.

In still other features, a method comprises associating N BSSID's with N access points (AP's), an $(N+1)^{th}$ BSSID with an external AP that communicates with M client stations, and at least one MAC address of at least one of the M client stations with at least one of the M client stations, where M is an integer greater than or equal to 1. The method comprises communicating with a client station associated with at least one of the N AP's using at least one of the N BSSID's. The method comprises selectively communicating with the external AP using the $(N+1)^{th}$ BSSID and at least one MAC address of at least one of the M client stations.

In another feature, the method further comprises emulating at least one of the N AP's, receiving a frame from a client station that communicates with one of the N AP's, and selectively transmitting the frame to the external AP by emulating at least one of the M client stations based on data in the frame, the N BSSID's, the (N+1) BSSID, and at least one MAC address of at least one of the M client stations.

In another feature, the method further comprises emulating at least one of the N AP's and transmitting the frame to a client station that communicates with one of the N AP's based on data in the frame, the N BSSID's, the (N+1)$^{th}$ BSSID, and at least one MAC address of at least one of the M client stations.

In another feature, the method further comprises receiving a frame from the external AP by emulating at least one of the M client stations, emulating at least one of the N AP's, and transmitting the frame to a client station that communicates with one of the N AP's based on data in the frame, the N BSSID's, the (N+1)$^{th}$ BSSID, and at least one MAC address of at least one of the M client stations.

In another feature, the method further comprises communicating via one baseband processor when emulating at least one of the N AP's and at least one of the M client stations. The method further comprises communicating via one radio frequency (RF) transceiver when emulating at least one of the N AP's and at least one of the M client stations.

In another feature, the method further comprises generating a plurality of target beacon transmission time (TBTT) pulse trains based on predetermined beacon intervals and predetermined DTIM periods. The method further comprises triggering the N AP's based on the TBTT pulse trains and transmitting beacons having beacon intervals proportional to N. The method further comprises transmitting the beacons that are staggered and non-overlapping.

In another feature, the method further comprises receiving frames, comparing MAC addresses in the frames with the N BSSID's, the (N+1)$^{th}$ BSSID, and at least one MAC address of at least one of the M client stations, and selectively routing the frames to one of one of the N AP's and at least one of the M client stations.

In still other features, a wireless network device comprises N access point (AP) modules having N BSSID's, where N is an integer greater than 1. The wireless network device comprises control means for communicating with the N AP modules, storing the N BSSID's, a BSSID of an (N+1)$^{th}$ external AP that communicates with M client stations, and at least one MAC address of at least one of the M client stations, where M is an integer greater than or equal to 1, and communicating with the (N+1)$^{th}$ external AP by emulating at least one of the M client stations.

In another feature, the control means receives a frame from a client station that communicates with one of the N AP modules, and selectively transmits the frame to the (N+1)$^{th}$ external AP based on data in the frame, the N BSSID's, the BSSID of the (N+1)$^{th}$ external AP, and at least one MAC address of at least one of the M client stations, wherein the wireless network device communicates with the (N+1)$^{th}$ external AP as at least one of the M client stations.

In another feature, the control means transmits the frame to a client station that communicates with one of the N AP modules based on data in the frame, the N BSSID's, the BSSID of the (N+1)$^{th}$ external AP, and at least one MAC address of at least one of the M client stations.

In another feature, the control means receives a frame from the (N+1)$^{th}$ external AP and transmits the frame to a client station that communicates with one of the N AP modules based on data in the frame, the N BSSID's, the BSSID of the (N+1)$^{th}$ external AP, and at least one MAC address of at least one of the M client stations, wherein the wireless network device communicates with the (N+1)$^{th}$ external AP as at least one of the M client stations.

In another feature, the wireless network device further comprises baseband processor means for communicating with the N AP modules and the control means. The wireless network device further comprises radio frequency (RF) transceiver means for communicating with the baseband processor means.

In another feature, the control means comprises transmit means for generating a plurality of target beacon transmission time (TBTT) pulse trains based on predetermined beacon intervals and predetermined DTIM periods. The TBTT pulse trains trigger the N AP modules that transmit beacons having beacon intervals proportional to N. The beacons are staggered and non-overlapping.

In another feature, the control means comprises receive means for receiving frames, comparing MAC addresses in the frames with the N BSSID's, the BSSID of the (N+1)$^{th}$ external AP, and at least one MAC address of at least one of the M client stations, and selectively routing the frames to one of one of the N AP modules and at least one of the M client stations.

In still other features, a computer program executed by a processor comprises associating N BSSID's with N access points (AP's), an (N+1)$^{th}$ BSSID with an external AP that communicates with M client stations, and at least one MAC address of at least one of the M client stations with at least one of the M client stations, where M is an integer greater than or equal to 1. The computer program comprises communicating with a client station associated with at least one of the N AP's using at least one of the N BSSID's. The computer program comprises selectively communicating with the external AP using the (N+1)$^{th}$ BSSID and at least one MAC address of at least one of the M client stations.

In another feature, the computer program further comprises emulating at least one of the N AP's, receiving a frame from a client station that communicates with one of the N AP's, and selectively transmitting the frame to the external AP by emulating at least one of the M client stations based on data in the frame, the N BSSID's, the (N+1)$^{th}$ BSSID, and at least one MAC address of at least one of the M client stations.

In another feature, the computer program further comprises emulating at least one of the N AP's and transmitting the frame to a client station that communicates with one of the N AP's based on data in the frame, the N BSSID's, the (N+1)$^{th}$ BSSID, and at least one MAC address of at least one of the M client stations.

In another feature, the computer program further comprises receiving a frame from the external AP by emulating at least one of the M client stations, emulating at least one of the N AP's, and transmitting the frame to a client station that communicates with one of the N AP's based on data in the frame, the N BSSID's, the (N+1)$^{th}$ BSSID, and at least one MAC address of at least one of the M client stations.

In another feature, the computer program further comprises communicating via one baseband processor when emulating at least one of the N AP's and at least one of the M client stations. The computer program further comprises communicating via one radio frequency (RF) transceiver when emulating at least one of the N AP's and at least one of the M client stations.

In another feature, the computer program further comprises generating a plurality of target beacon transmission time (TBTT) pulse trains based on predetermined beacon intervals and predetermined DTIM periods. The computer program further comprises triggering the N AP's based on the TBTT pulse trains and transmitting beacons having beacon intervals proportional to N. The computer program further comprises transmitting the beacons that are staggered and non-overlapping.

In another feature, the computer program further comprises receiving frames, comparing MAC addresses in the frames with the N BSSID's, the (N+1)$^{th}$ BSSID, and at least one MAC address of at least one of the M client stations, and selectively routing the frames to one of one of the N AP's and at least one of the M client stations.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 12A is a functional block diagram of a set top box; and

FIG. 12B is a functional block diagram of a media player.

DETAILED DESCRIPTION OF THE PREFERRED EMBODIMENTS

Figure 1:
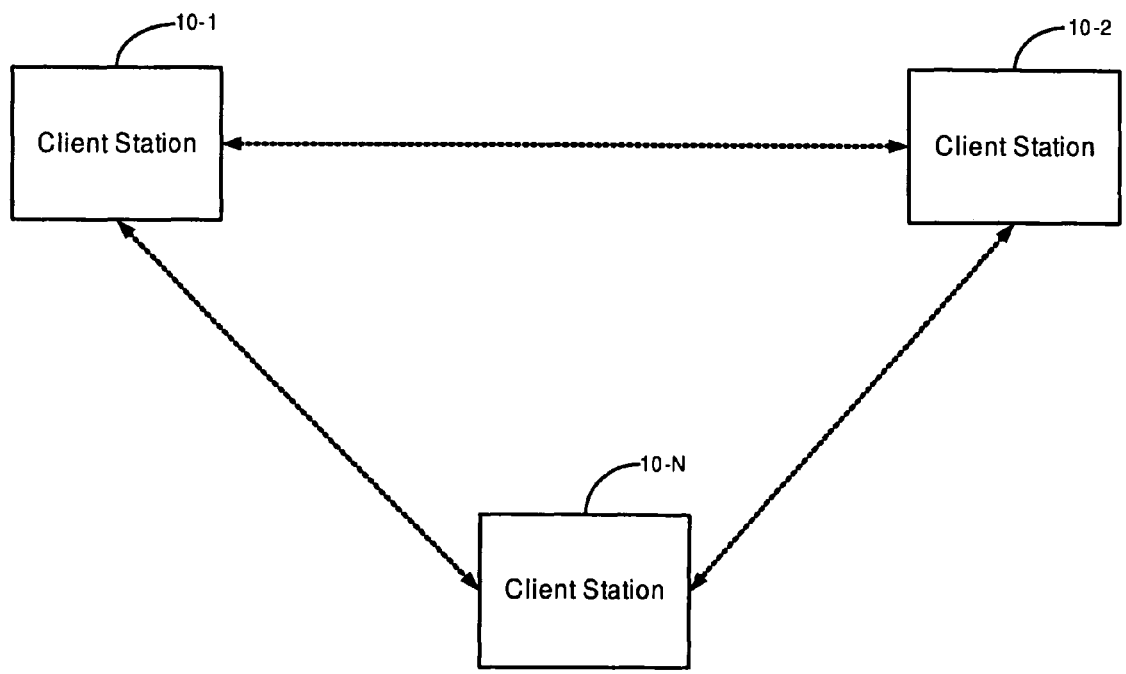
FIG. 1 is a functional block diagram of an exemplary wireless Ethernet network illustrating network devices operating in an ad-hoc mode according to the prior art.
Figure 2:
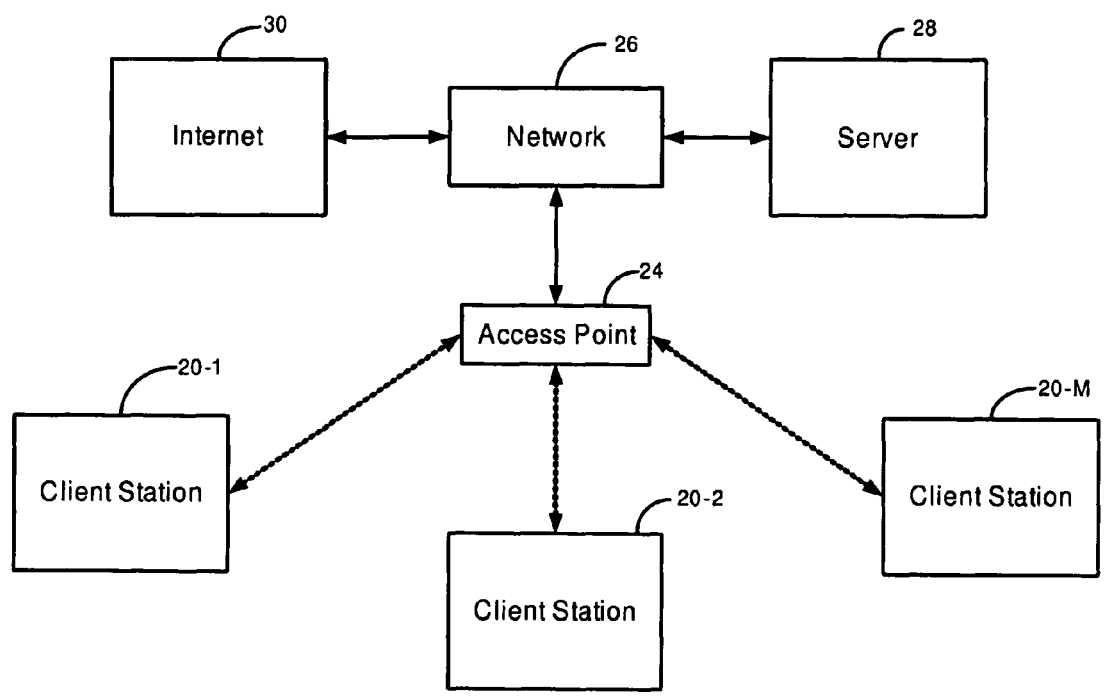
FIG. 2 is a functional block diagram of an exemplary wireless Ethernet network illustrating network devices operating in an infrastructure mode according to the prior art.
Figure 3:
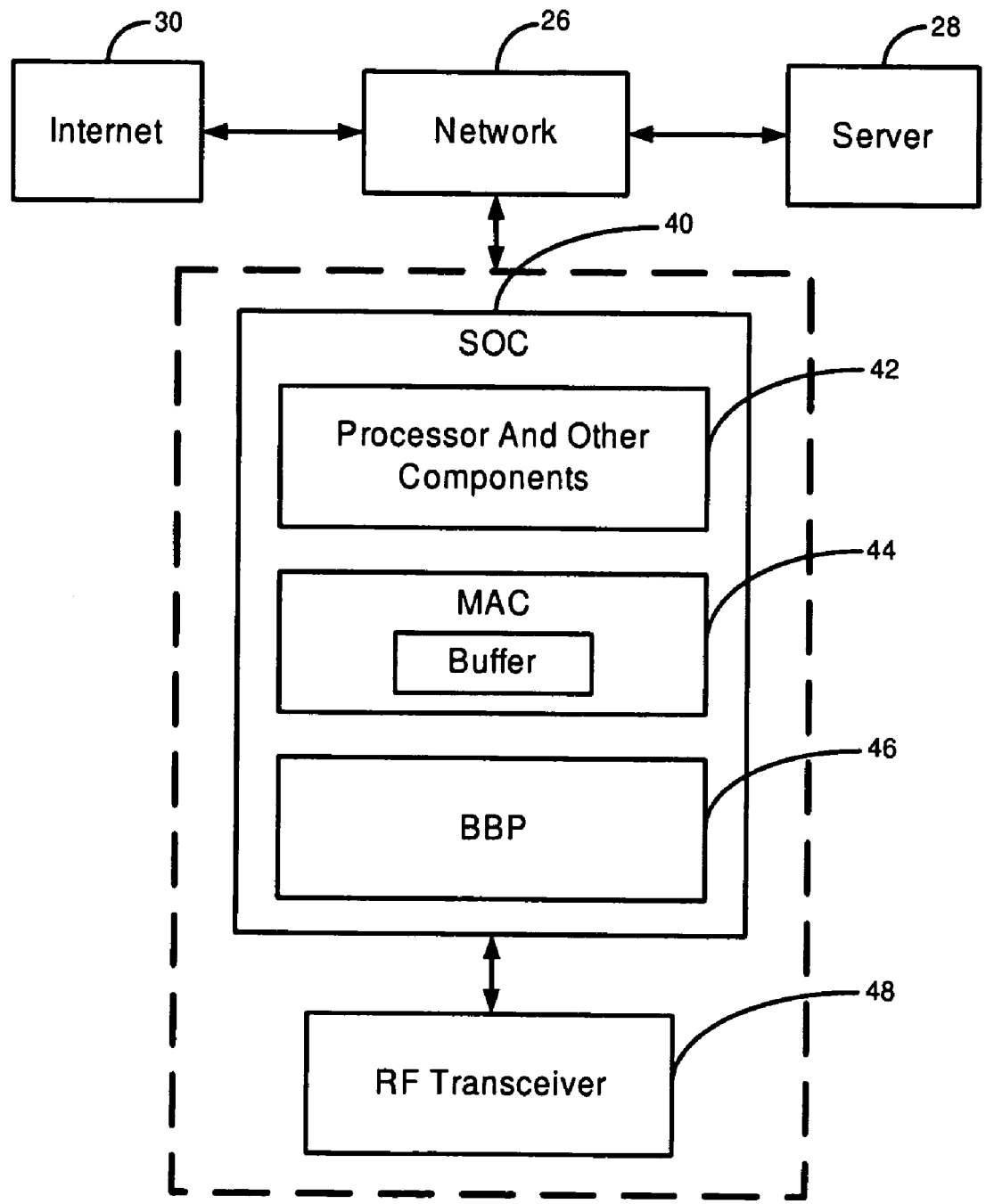
FIG. 3 is a functional block diagram of a wireless Ethernet network device illustrating an exemplary implementation using an SOC circuit according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module, controller and/or device refers to an application specific integrated circuit (ASIC), an electronic circuit, a processor (shared, dedicated, or group) and memory that execute one or more software or firmware programs, a combinational logic circuit, and other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

Some circuits or devices in a wireless Ethernet network device perform a function that is unique to the network device. For example, a medium access controller (MAC) device in a wireless Ethernet network device has a unique identifier called a MAC address that identifies the wireless Ethernet network device as the sender or the recipient of a data packet or frame. The address is used to route data to the identified network device.

On the other hand, some circuits or devices in a wireless Ethernet network device perform a function that is not unique to the network device. For example, a baseband processor (BBP) performs the same function in each network device. Similarly, a radio frequency (RF) transceiver performs the same function in each network device.

In a large network, multiple circuits or devices like the BBP and the RF transceiver cumulatively consume substantial electrical power and increase the cost of the network. The problem is compounded when the network operates in an infrastructure mode because each basic service set (BSS) requires an access point (AP), which is an additional device that has a BBP and a RF transceiver, to communicate with other client stations. Moreover, as the number of client stations in a network increases, more AP's may be necessary to operate the network. Correspondingly, the number of BBP's and RF transceivers in the network also increases. As can be appreciated, the AP's, the BBP's, and the RF transceivers consume a significant amount of power and significantly increase the cost of networking.

Figure 4:
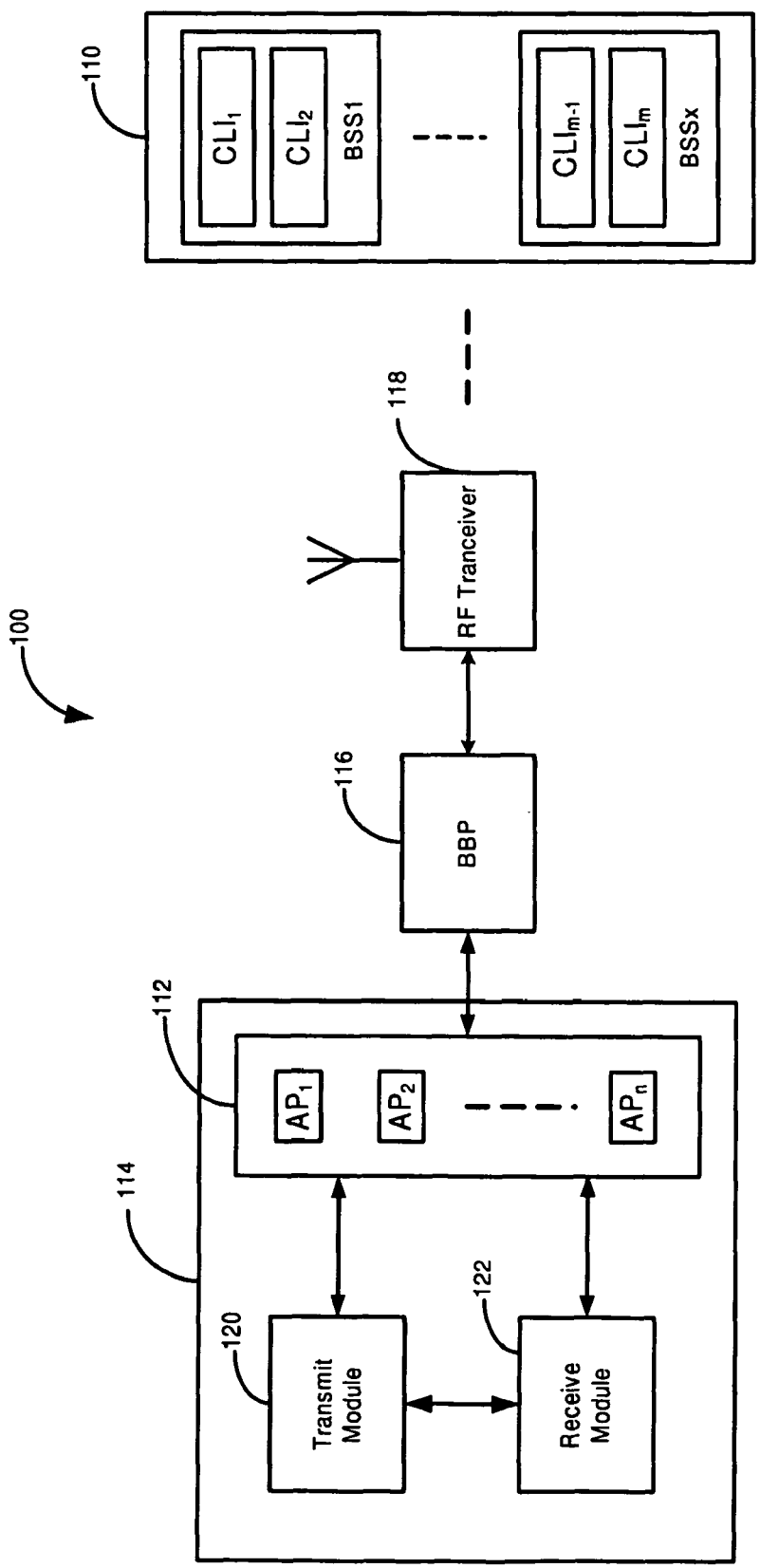
FIG. 4 is a functional block diagram of an exemplary wireless Ethernet network implementation according to the present invention.

Referring now to FIG. 4, a system 100 for implementing a wireless Ethernet network when multiple AP's are incorporated in a single device is shown. Multiple client stations 110 such as $CLI_1$, $CLI_2$, . . . , $CLI_m$ may form multiple basic service sets (BSS's) BSS1, BSS2, . . . , and BSSx that operate in an infrastructure mode in the network. Each BSS requires an AP to communicate over the network. A multi-access point device 114 functions as a single physical AP when supporting each BSS. The device 114, however, comprises multiple virtual AP's 120 such as $AP_1$, $AP_2$, . . . , $AP_n$ that support multiple BSS's.

The AP's 112 in the device 114 are individual circuits and/or modules. None of the AP's 112 includes a BBP and a RF transceiver that each traditional AP would typically include. The AP's 112 utilize a single BBP 116 and a single RF transceiver 118 that may be either incorporated in the multi-access point device 114 or located external to the multi-access point device 114.

The multi-access point device 114 comprises a transmit module 120 and a receive module 122 that manage the communication between the AP's 112 and the client stations 110. Although shown separately for illustrative purposes, the transmit module 120 and the receive module 122 may be implemented in a single module. Similarly, the BBP 116 and the RF transceiver 118 may also be incorporated in the multi-access point device 114.

Figure 5:
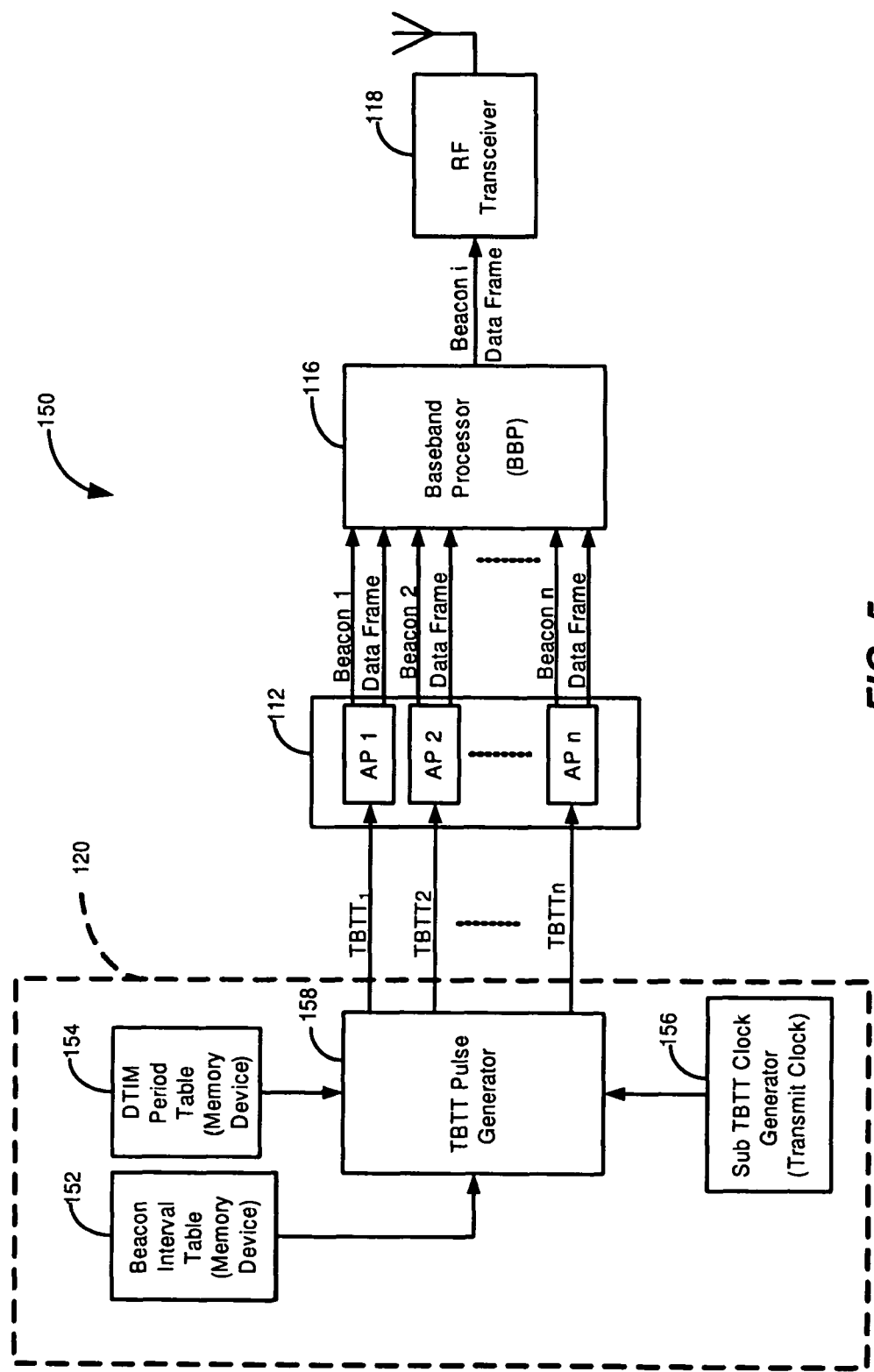
FIG. 5 is a functional block diagram of an exemplary implementation of a transmit module when multiple AP's are incorporated in a single device according to the present invention.
Figure 6:
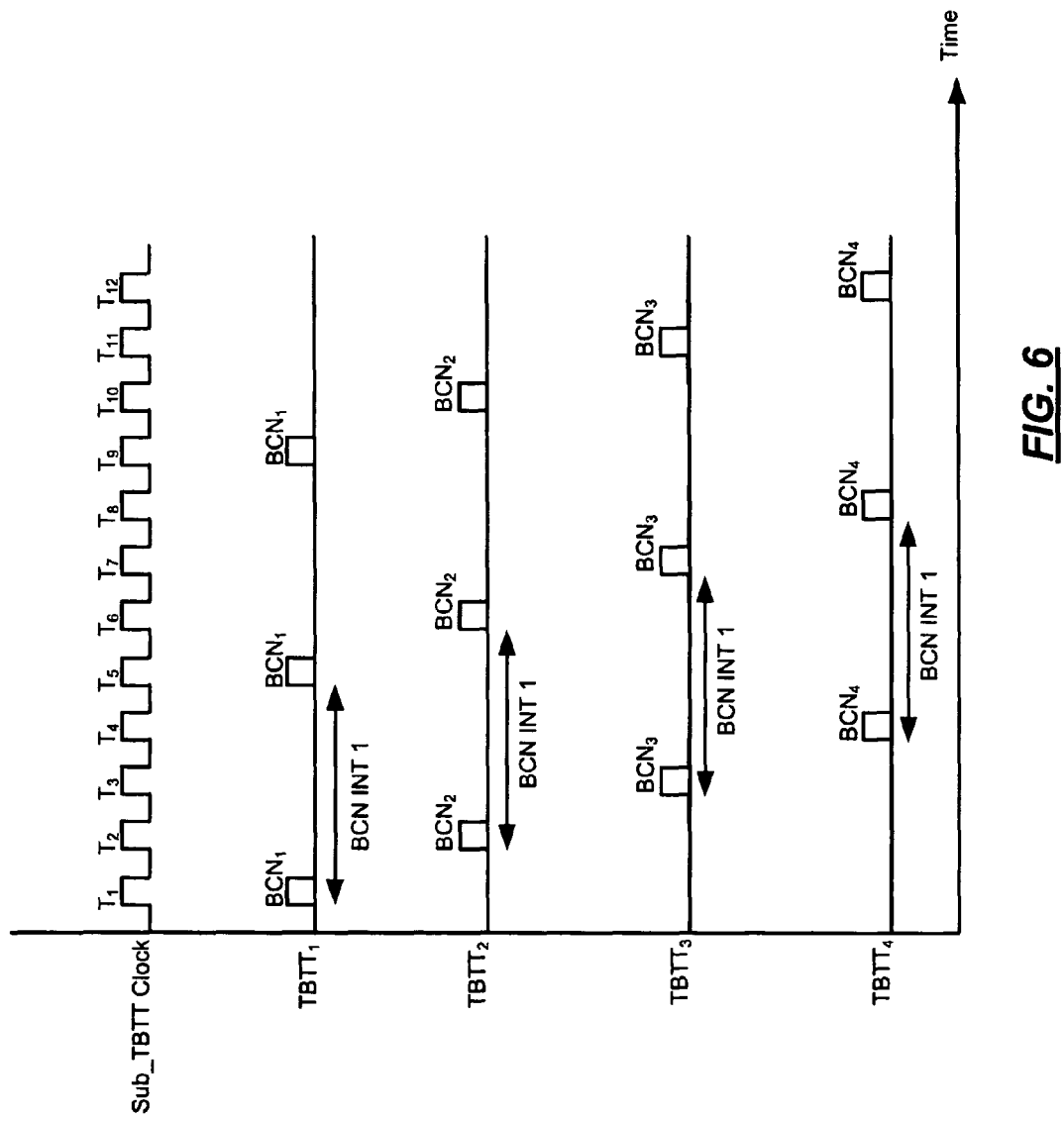
FIG. 6 shows exemplary waveforms generated within and by the transmit module according to the present invention.

Referring now to FIGS. 5 and 6, a system 150 for implementing a transmit module 120 when multiple AP's are incorporated in a single multi-access point device 114 is shown. Depending on the number of BSS's and CLI's in the network, a network administrator (not shown) defines beacon intervals for the AP's 112 and stores them in the form of a lookup table in a memory device 152. The beacon interval for each AP is unique, distinct, and depends on the number of AP's in the multi-access point device 114, that is, the number of BSS's in the network.

Similarly, each BSS may also have a different delivery traffic indication message (DTIM) period, that is, the period between the DTIM beacons. Accordingly, the network administrator defines a DTIM period table and stores the table in a memory device 154. The memory devices 152 and 154 are shown for illustrative purpose only and may be incorporated as a single memory device. Any suitable electronic data storage may be used.

A transmit clock generator 156 provides a basic clock to a pulse generator 158. The pulse generator 158 uses the values from the beacon interval table and the DTIM period table to generate individual TBTT's for the AP's 112. As shown in FIG. 6, the AP's 112 are triggered to transmit beacons in a staggered, non-overlapping manner. For example, BCN, can occur only every other sub_TBTT clock pulse if two BSS's are being supported. As shown in FIG. 6, beacons for any one BSS occur at every fourth sub_TBTT clock pulse if a total of four BSS's are being supported, etc. This serves two purposes: (1) this approach avoids collisions among the beacons transmitted by multiple AP's, and (2) this approach allows the client stations associated with each BSS to wake up at an appropriate time before the corresponding AP's beacon.

When an AP 112 is triggered, the AP transmits a beacon using the same BBP 116 and the same RF transceiver 118. Notably, only the beacons are transmitted in a staggered, non-overlapping manner. The staggered method of transmission does not apply to data frames or traffic.

Figure 7:
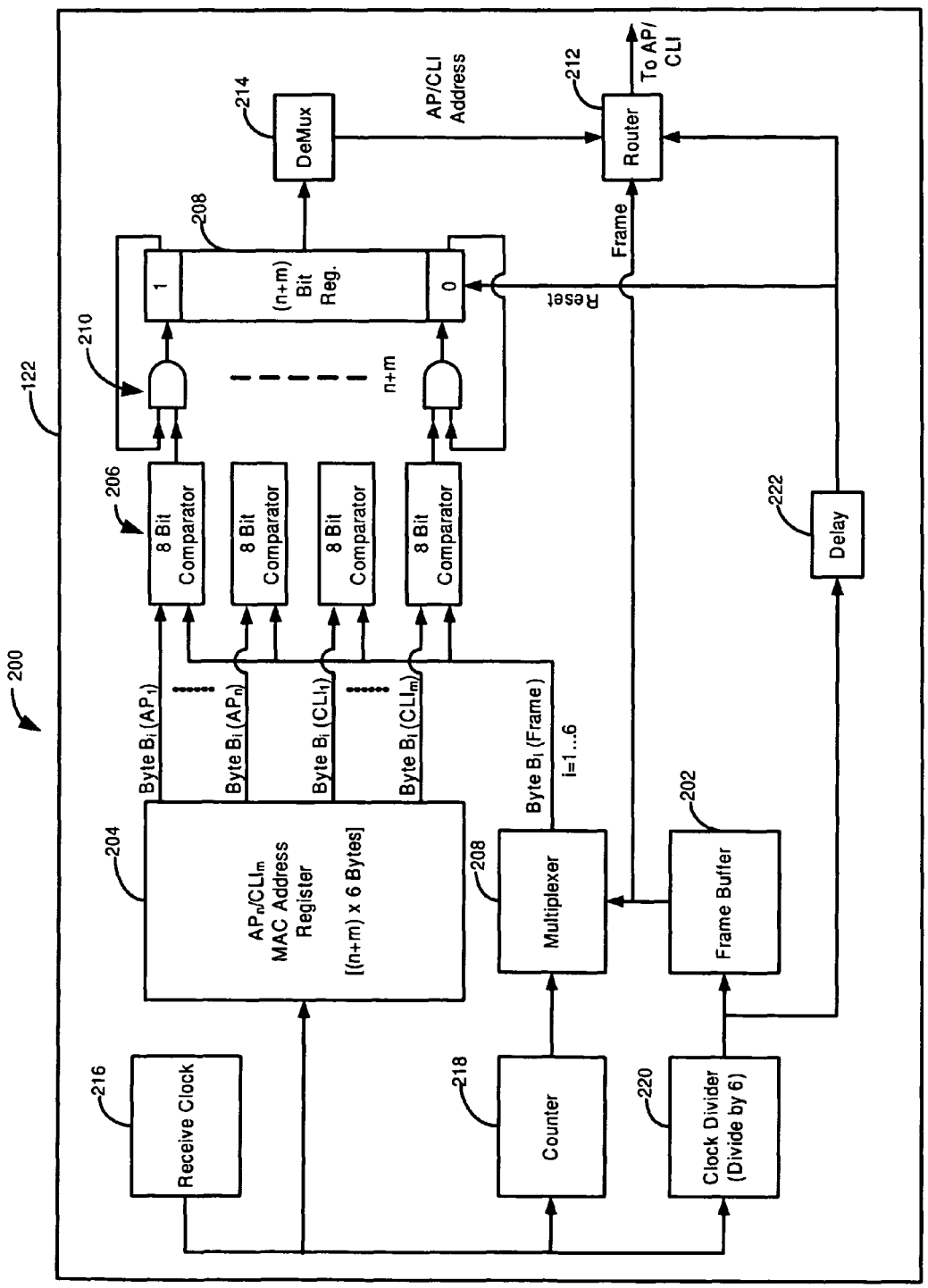
FIG. 7 is a functional block diagram of an exemplary implementation of a receive module when multiple AP's are incorporated in a single device according to the present invention.

Referring now to FIGS. 7-8, a system 200 for implementing a receive module 122 when multiple AP's are incorporated in a single multi-access point device 114 is shown. To support multiple client stations while simultaneously functioning as an AP, the receive module 122 in the multi-access point device 114 determines whether a frame received by the multi-access point device 114 is addressed to one of the AP's 112 or one of client stations $CLI_m$ 110.

Figures 8A, 8B:
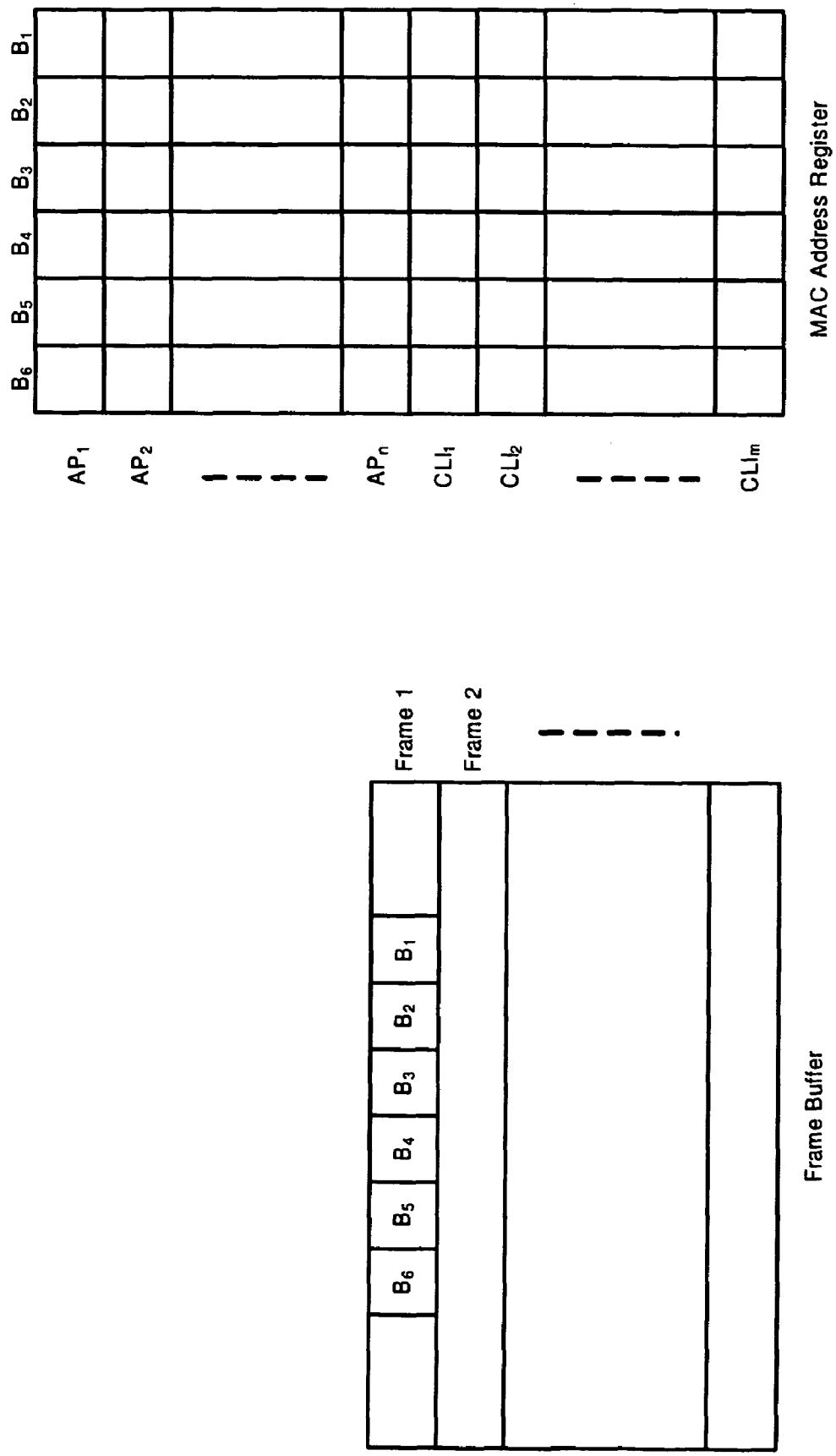
FIG. 8A illustrates an exemplary frame buffer in the receive module according to the present invention.
FIG. 8B illustrates an exemplary MAC address register in the receive module according to the present invention.

The frames received by the multi-access point device 114 are stored in a frame buffer 202. As shown in FIG. 8A, each frame contains a 6-byte identifier or MAC address (BSSID) that identifies the recipient of that frame. The recipient may be an access point $AP_n$ 112 or a client station $CLI_m$ 110. The receive module 122 decodes the 6-byte identifier from each frame and routes the frame to the recipient identified by the MAC address in the frame.

The receive module 122 comprises a MAC address register 204 that contains the 6-byte MAC addresses (BSSIDs) of each of the $AP_n$'s 112 and $CLI_m$'s 110 in the network. Thus, as shown in FIG. 8B, the size of the register 204 is (n+m)×6-bytes.

A bank of (n+m) 8-bit comparators 206 compares each of the six bytes in the MAC address in a frame, one byte at a time, to the corresponding byte of the MAC addresses of all the $AP_n$'s and $CLI_m$'s stored in the register 204. Thus, each of the (n+m) 8-bit comparators 206 may include either eight 2-input XOR gates or two 8-input XOR gates etc.

Byte $B_1$ of the MAC address in a frame is compared to bytes $B_1$ of the MAC address of each $AP_n$ and $CLI_m$. Thus, byte $B_1$ from the frame is fed to one input of each of the (n+m) 8-bit comparators 206. Byte $B_1$ of $AP_1$ from the register 204 is fed to the other input of a first comparator of the (n+m) comparators 206; byte $B_1$ of $AP_n$ from the register 204 is fed to the other input of an $n^{th}$ comparator of the (n+m) comparators 206; byte $B_1$ of $CLI_1$ from the register 204 is fed to the other input of an $(n+1)^{th}$ comparator of the (n+m) comparators 206; and byte $B_1$ of $CLI_m$ from the register 204 is fed to the other input of an $(n+m)^{th}$ of the (n+m) comparators 206.

The results of the (n+m) comparisons made for byte B, of the MAC address in the frame are stored in a flag register 208. Thus, the size of the flag register 208 is (n+m)×1 bit.

A bank of (n+m) devices, such as 2-input AND gates, 210 AND the results of the (n+m) 8-bit comparators for a byte $B_1$ with the results of the comparators for a byte $B_{i-1}$. Therefore, all the (n+m) bits of the flag register 208 are set to 1 before each frame from the buffer 202 is analyzed. For example, when the byte $B_2$ of the MAC address in the frame is compared to the byte $B_2$ of the MAC address of each $AP_n$ and $CLI_m$, the results of the comparison are ANDed to the results of the comparison for byte $B_1$. The procedure is repeated until byte $B_6$ is compared. Thus, after all the six bytes are compared, a maximum of one of the (n+m) bits in the flag register 208 will be set to 1 if the MAC address in a frame matches a MAC address of one of the $AP_n$'s or one of the $CLI_m$'s.

If the MAC address in the frame matches a MAC address of an $AP_n$ or a $CLI_m$, then that frame is routed to that $AP_n$ or $CLI_m$ by a router 212. The matching address from the flag register 208 is decoded and fed to the router 212 by a demultiplexer 214. At the same time, the analyzed frame from the frame buffer 202 is forwarded to the router 212. That frame is routed to the addressed AP, or if the frame is addressed to a client station, then the frame is sent to the respective AP in the BSS so that the AP can transmit the frame to the associated client station.

If, however, the MAC address in the frame does not match any of the MAC addresses in the flag register 208, the frame is discarded. After the completion of the comparison for one frame, a next frame in the frame buffer 202 is selected for comparison, and the procedure is repeated.

If the first byte from the MAC address in the frame does not match the first byte of any of the MAC addresses of the AP's and the CLI's, then the comparisons of the remaining bytes are unnecessary. Nonetheless, all of the six bytes may be compared. Comparing one byte at a time of the MAC address in the frame to the corresponding byte of the MAC addresses of the AP's and the CLI's is more efficient than comparing the entire 6-byte MAC address in the frame to the 6-byte MAC addresses of the API's and the CLI's. The efficiency is more apparent as the number of AP's and the CLI's increases.

The timing of operation of all the circuits in the system 200 is synchronized by a receive clock 216. For example, the receive clock 216 shifts the (n+m)×1 byte in the MAC address register 204 at each clock cycle so that only one of the six bytes of the MAC addresses of each of the $AP_n$ and $CLI_m$ is fed to the respective comparators 206. Concurrently, a counter 218 that is driven by each clock cycle, addresses the multiplexer 208 so that the multiplexer selects only one of the six bytes of the MAC address in a frame and feeds that byte to the other inputs of the (n+m) comparators 206.

Thus, the receive clock 216, the counter 218, and the multiplexer 208 ensure that at each clock cycle, the same byte $B_i$ of the frame is compared to the same byte $B_i$ of all the $AP_n$'s or a $CLI_m$'s in the MAC address register 204. Thus, in six clock cycles, the entire MAC address in the frame is compared to all the MAC addresses of all the $AP_n$'s or a $CLI_m$'s in the MAC address register 204.

A clock divider 220 divides the receive clock 216 by six. Thus, after every six clock cycles, that is, after all the six bytes of the MAC address in the frame are compared, the processed frame in the buffer 202 is forwarded to the router 212. The router 212 transmits the processed frame to the addressed recipient, and a next frame in the frame buffer 202 is concurrently selected for MAC address comparison.

A delay circuit 222 adds time to the clock output of the clock divider 220 so that the router 212 has sufficient time to get the address of the recipient from the demultiplexer 214 before transmitting the frame to the addressed recipient. The delay is equal to the sum of the time the comparators 206 take to compare, the time the AND gates 210 take to AND, and the time the demultiplexer 214 takes to decode the address in the flag register 208.

Many devices in the system 200, such as the receive clock 216, the clock divider 220, the delay circuit 222, the counter 218, the multiplexer 208, the demultiplexer 214, etc., are shown as separate devices for illustrative purpose only. More than one device, however, can be implemented in a single module such as the receive module 122.

The number of AP's that can be incorporated in a single multi-access point device 114, that is, the number of BSS's that can be supported by the multi-access point device 114, is a function of the speeds of hardware and software. As the number of AP's 112 increases, the performance of the system 100 can be optimized by sharing of resources within the system 100 by one set of AP's with another set of AP's. For example, if a total of 16 AP's are incorporated in a single multi-access point device 114, the 16 AP's can be split into two sets of 8, and $AP_9$ can share resources with $AP_1$; $AP_{10}$ can share resources with $AP_2$ etc.

Furthermore, the number of AP's and CLI's that can be supported by the multi-access point device 114 may be enhanced by masking some bits of the MAC addresses in the MAC address register 204. Specifically, when an address bit in an entry in the MAC address register 204 is masked, a comparison by the comparators 206 of that address bit is ignored. This allows each entry in the MAC address register 204 to store multiple MAC addresses instead of a single MAC address. By treating a masked bit in an entry as a match, a group of MAC addresses in the received frames can be treated as matching that entry. Thus, the total number of AP's and CLI's that can be supported by the multi-access point device 114 can be more than the number of MAC address entries in the MAC address register 204.

Additionally, each entry in the MAC address register 204 comprises an enable bit. The enable bit can be set so that a MAC address comparison will be disabled for that entry. Thus, by properly setting the enable bits, the multi-access point device 114 can communicate with a varying number of AP's and CLI's without changing the number of entries in (and the size of) the MAC address register 204.

Figure 9:
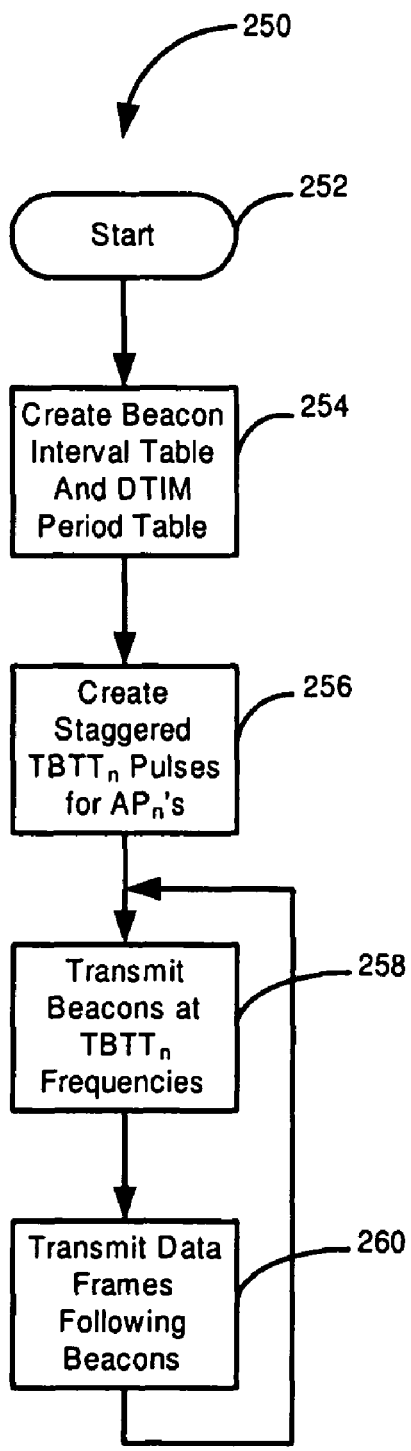
FIG. 9 is a flowchart illustrating an exemplary method for transmitting data when multiple AP's are incorporated in a single device according to the present invention.

Referring now to FIG. 9, a method 250 of transmitting data when multiple AP's are incorporated in a single device is shown. The method begins at step 252. In step 254, a network administrator creates a beacon interval table 152 and a DTIM period table 154 for the AP's 112. In step 256, a pulse generator 158 creates staggered, non-overlapping $TBTT_n$ pulses for the $AP_n$'s 112.

In step 258, the $AP_n$'s 112 transmit beacons $BCN_n$'s at the respective TBTT pulse frequencies. In step 260, the AP's 112 transmit data frames following respective beacon transmissions. All the transmissions of all the $AP_n$'s 112 are carried out by a single BBP 116 and a single RF transceiver 118. The steps 258 and 260 are repeated.

Figure 10:
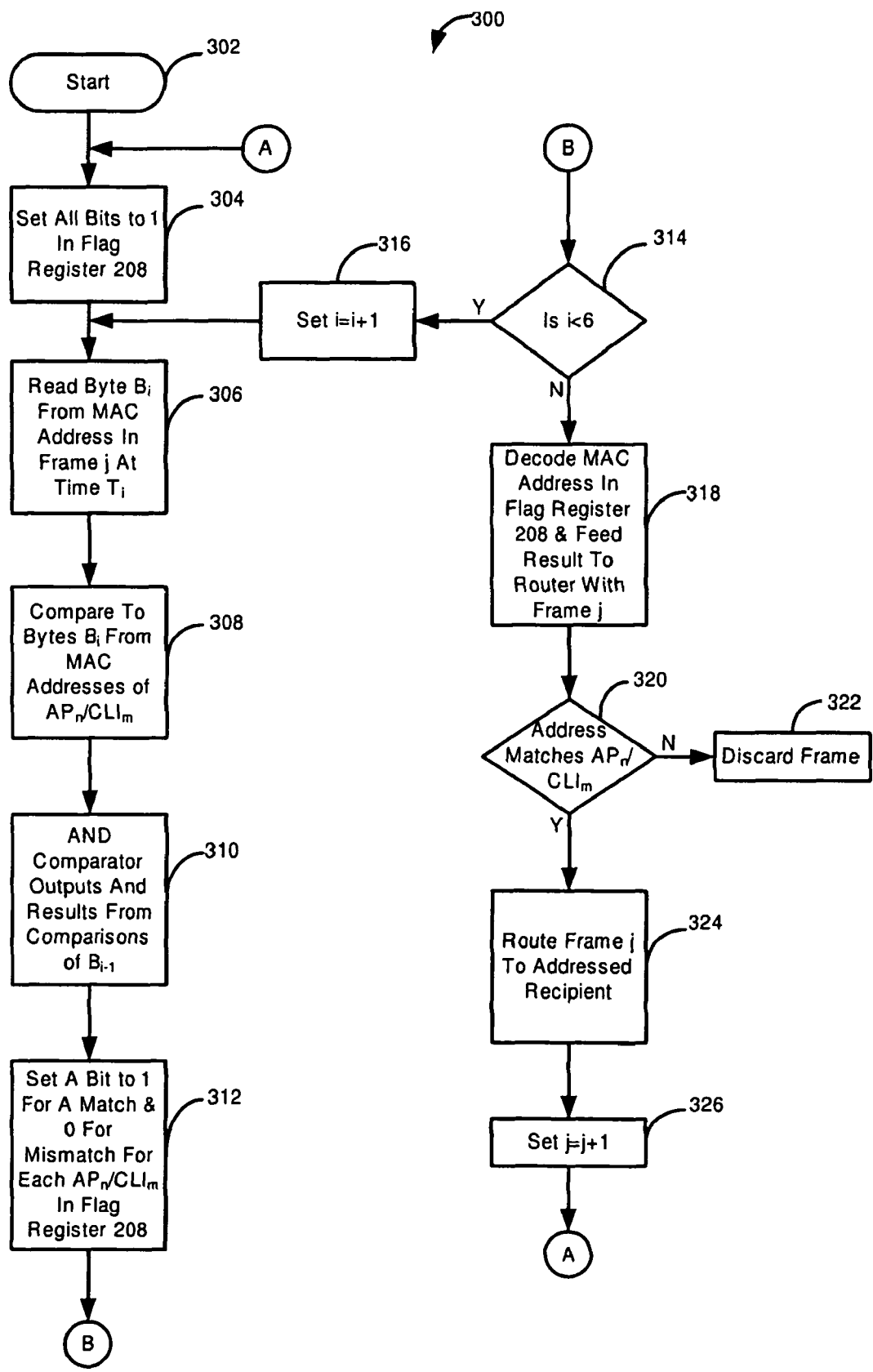
FIG. 10 is a flowchart illustrating an exemplary method for receiving data when multiple AP's are incorporated in a single device according to the present invention.

Now referring to FIG. 10, a method 300 of receiving data when multiple AP's are incorporated in a single device is shown. The method begins at step 302. In step 304, all the (n+m) bits of a flag register 208 are set to 1.

In step 306, a byte $B_i$ of a MAC address in a frame j stored in a frame buffer 202 is read at time $T_i$. In step 308, comparators 206 compare that byte to bytes $B_i$ of all the MAC addresses of n AP's and m CLI's. In step 310, (n+m) devices such as AND gates 210 AND the (n+m) comparator outputs with the (n+m) results stored in the flag register 208 from a previous comparison, or all 1's if byte $B_i$ is the first of the six bytes of the MAC address in a new frame.

In step 312, the output of the AND gates 210 are stored in the (n+m) bits in the flag register 208. For example, a 1 indicates that a byte $B_i$ in the MAC address of the frame j matched with a byte $B_i$ of one of the n AP's and m CLI's, and in that case, a 0 (zero) indicates no match. If inverse logic is used, then a different type of gate may be used; and a 0 (zero) will indicate a match, and a 1 will indicate no match In step 314, if the number of bytes compared is less than six, then the entire MAC address in frame j is not yet compared, and in step 316, the byte count is incremented, and the next byte is compared at time $T_{i+1}$ as indicated in steps 306, 308, 310, and 312. If, however, in step 314, the number of bytes compared is six, then the entire MAC address in the frame j is already compared.

In step 318, after the entire MAC address in the frame J is compared, a demultiplexer 214 decodes the (n+m) bits of the flag register 208. If any of the (n+m) bits of the flag register 208 is a 1, then the MAC address in the frame j matched the MAC address of an AP or a CLI that corresponds to that bit position in the flag register 208. For example, if the first bit of the flag register 208 is a 1, then the MAC address in the frame j matched the MAC address of the $AP_1$. If, however, none of the (n+m) bits is 1, then the MAC address in the frame j did not match the MAC address of any of the $AP_n$'s and $CLI_m$'s. Again, if inverse logic is used, then a 0 (zero) will indicate a match, and a 1 will indicate no match.

The demultiplexer 214 forwards the result of decoding the (n+m) bits of the flag register 208 to the router 212. Concurrently, the frame j is forwarded from the frame buffer 202 to the router 212.

In step 320, the router 212 determines if the MAC address in frame j matches the MAC address of any of the n AP's or m CLI's. In step 322, the frame j is discarded if the address in the frame j does not match any of the MAC addresses of the n AP's and the m CLI's. If, however, the MAC address in the frame j matches a MAC address of one of the n AP's and m CLI's, then in step 324, the router 212 routes the frame j to the addressed recipient. In step 326, the next frame in the frame buffer 202 is selected for MAC address comparison and routing, and the method 300 returns to step 304.

Figure 11A:
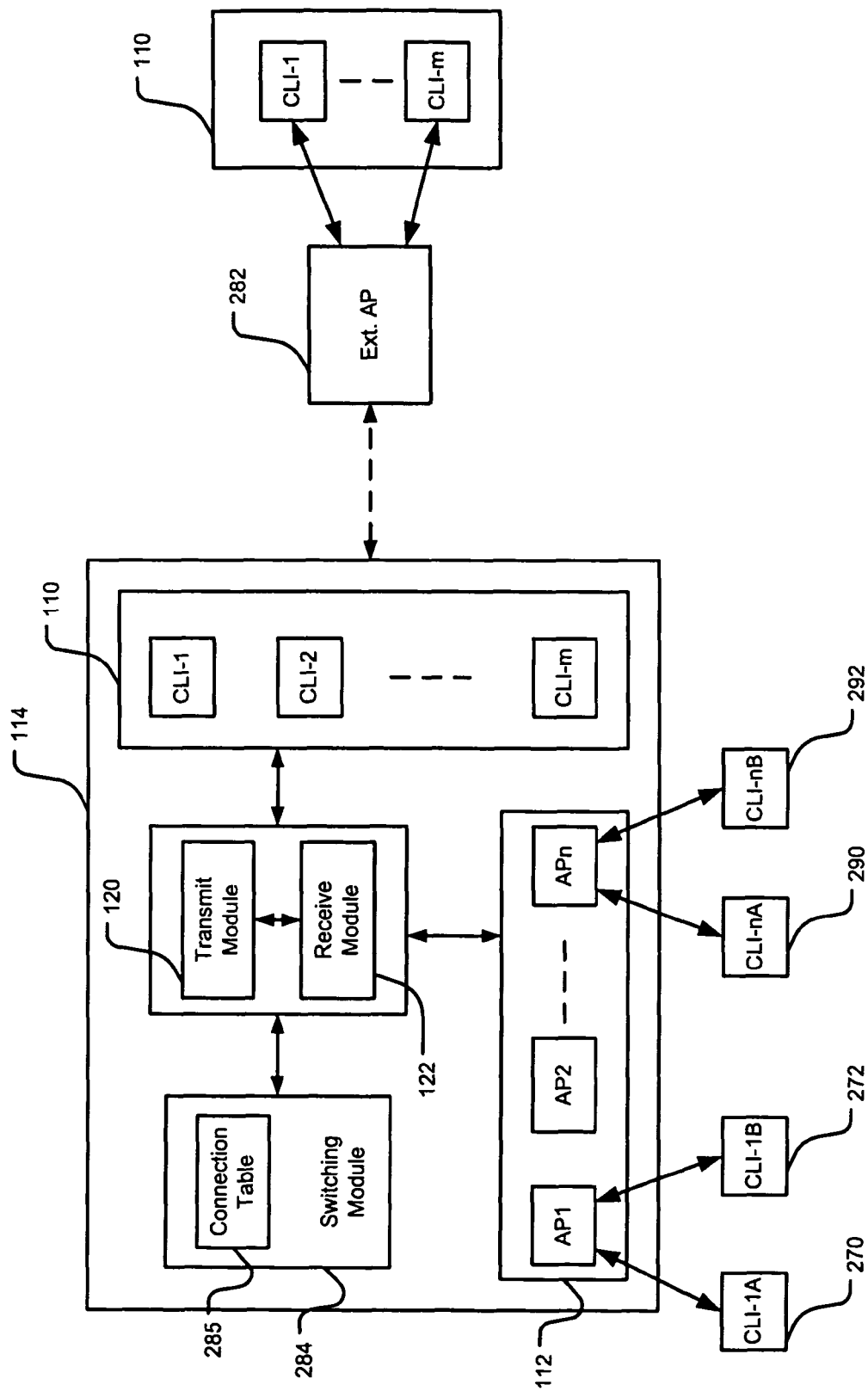
FIG. 11A is a functional block diagram of an exemplary system for routing frames using a network device that simultaneously implements AP's and client stations according to the present invention.

Referring now to FIG. 11A, the multi-access point device 114 can implement multiple client stations CLI-1, CLI-2, . . . , CLI-m (collectively CLI-m) 110 that communicate with an external AP 282 while the multi-access point device 114 simultaneously implements one of the AP's 112. For example, the multi-access point device 114 may implement a client station CLI-m 110 that communicates with the external AP 282 and may implement AP1 that communicates with client station CLI-1A 272. The multi-access point device 114 essentially emulates at least one of the AP's 112 while simultaneously emulating the client station CLI-M 110 that communicates with the external AP 282.

The multi-access point device 114 may receive frames that comprise more than one BSSID. For example, a frame may comprise a BSSID of AP1 and a BSSID of $AP_n$ if the frame is received from the client station CLI-1A 272 that communicates with AP1 112 and is addressed to client station CLI-1n 290 that communicates with $AP_n$ 112. Therefore, each entry in the MAC address register 204 comprises two BSSIDs: a BSSID of one of the AP's 112 (BSSID1) and the BSSID of the external AP (BSSID2).

When a unicast frame is received, the multi-access point device 114 determines if the BSSID in the frame matches a BSSID1 of one of the AP's 112 stored in the MAC address register 204. On the other hand, when a multicast frame is received, the multi-access point device 114 determines if the BSSIDs in the frame match a BSSID1 of one of the AP's 112 and the BSSID2 of the external AP in the MAC address register 204. The frame is accepted when the BSSIDs in the frame match both BSSID1 and BSSID2.

Additionally, the multi-access point device 114 may route frames from one BSS comprising one of the AP's 112 to another BSS comprising the external AP 282 and vice versa. An exemplary method that may be used by the multi-access point device 114 to route frames is described in U.S. patent application Ser. No. 11/389,293, filed on Mar. 24, 2006, which is hereby incorporated by reference in its entirety. Essentially, the multi-access point device 114 may comprise a switching module 284 having a connection table 285 to accomplish frame routing. The switching module 284 may use a method similar to that described in said U.S. patent application Ser. No. 11/389,293.

The method to route frames can be similar to a method typically used by a network device such as a router or a switch to find a desired location on the Internet. For example, the network device may utilize discovery mechanisms that use broadcast packets, such as address resolution protocol (ARP) packets, to find a location on the Internet. When the ARP packets receive a response, the network device determines the address of the location that responds. The network device thus learns the address of the location that responds. The network device builds a connection table comprising addresses derived from the responses. The addresses are paired with the responding locations. The network device subsequently uses the addresses in the connection table to route data to locations paired with the addresses.

Similarly, the multi-access point device 114 builds the connection table 285 in the switching module 284 and uses the addresses in the connection table 285 to route data between clients of AP's 112 and the external AP 282. Each entry in the connection table 285 comprises a pair of addresses: a MAC address of a client station and a BSSID of the associated AP. For example, the connection table 285 comprises MAC addresses of client stations CLI-m 110 paired with the BSSID of the external AP 282, MAC addresses of CLI-1A 270 and CLI-1B 272 paired with the BSSID of AP1, etc.

The switching module 284 communicates with the receive module 122 and the transmit module 120. The switching module 284 receives frames from the receive module 122. The frames may be received from one of the AP's 112 or from the external AP 282. The switching module 284 compares MAC addresses and BSSIDs in the frames to the addresses in the connection table 285 and determines whether the frames are to be routed to one of the AP's 112 or to the external AP 282. When the frames are routed to the external AP 282, the multi-access point device 114 communicates with the external AP 282 as a client station CLI-m 110 of the external AP 282. Similarly, when the multi-access point device 114 receives frames from the external AP 282, the multi-access point device 114 communicates with the external AP 282 as a client station CLI-m 110 of the external AP 282.

Figure 11B:
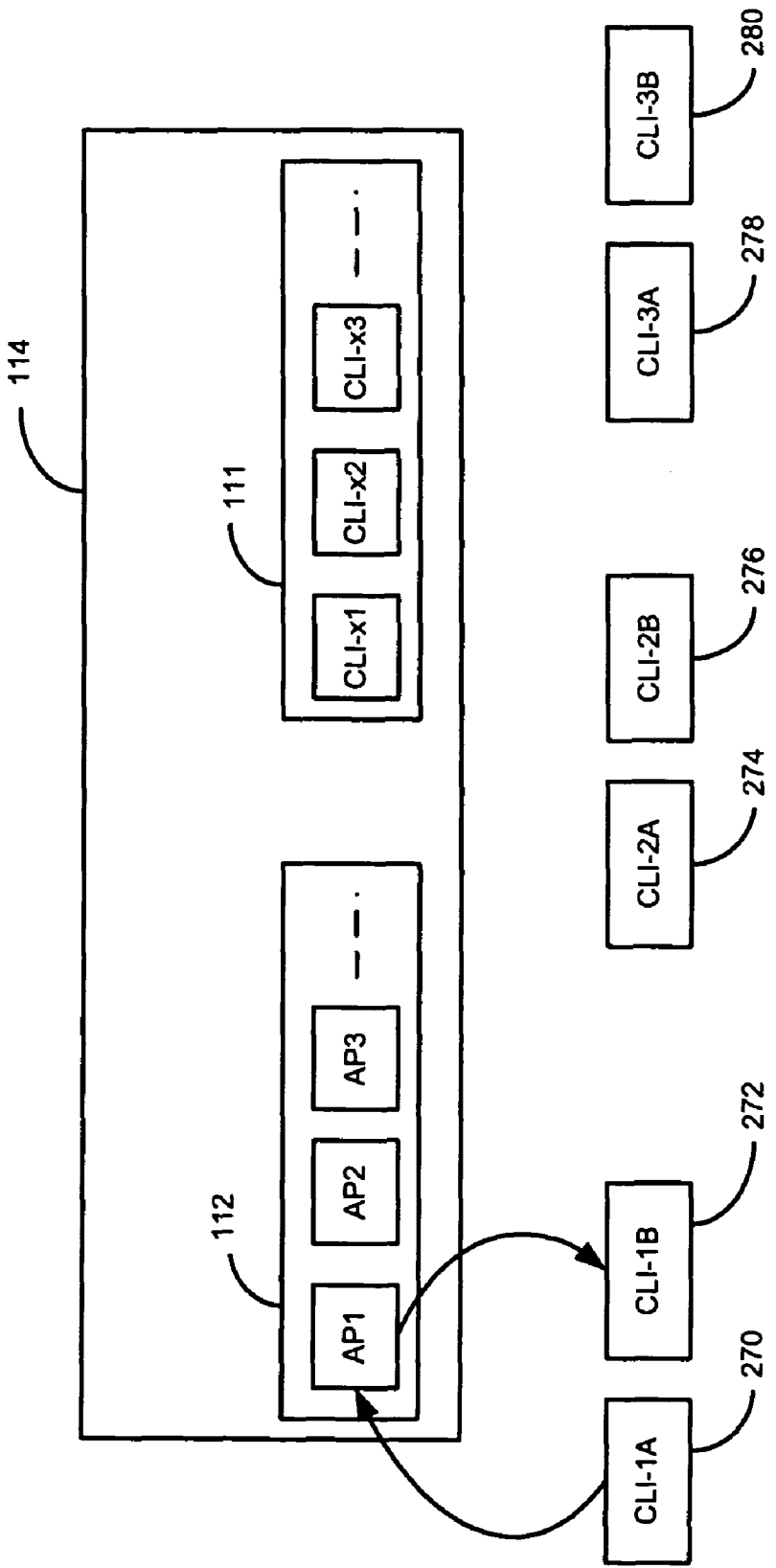
FIG. 11B shows an exemplary communication between two client stations in a basic service set according to the present invention.
Figure 11C:
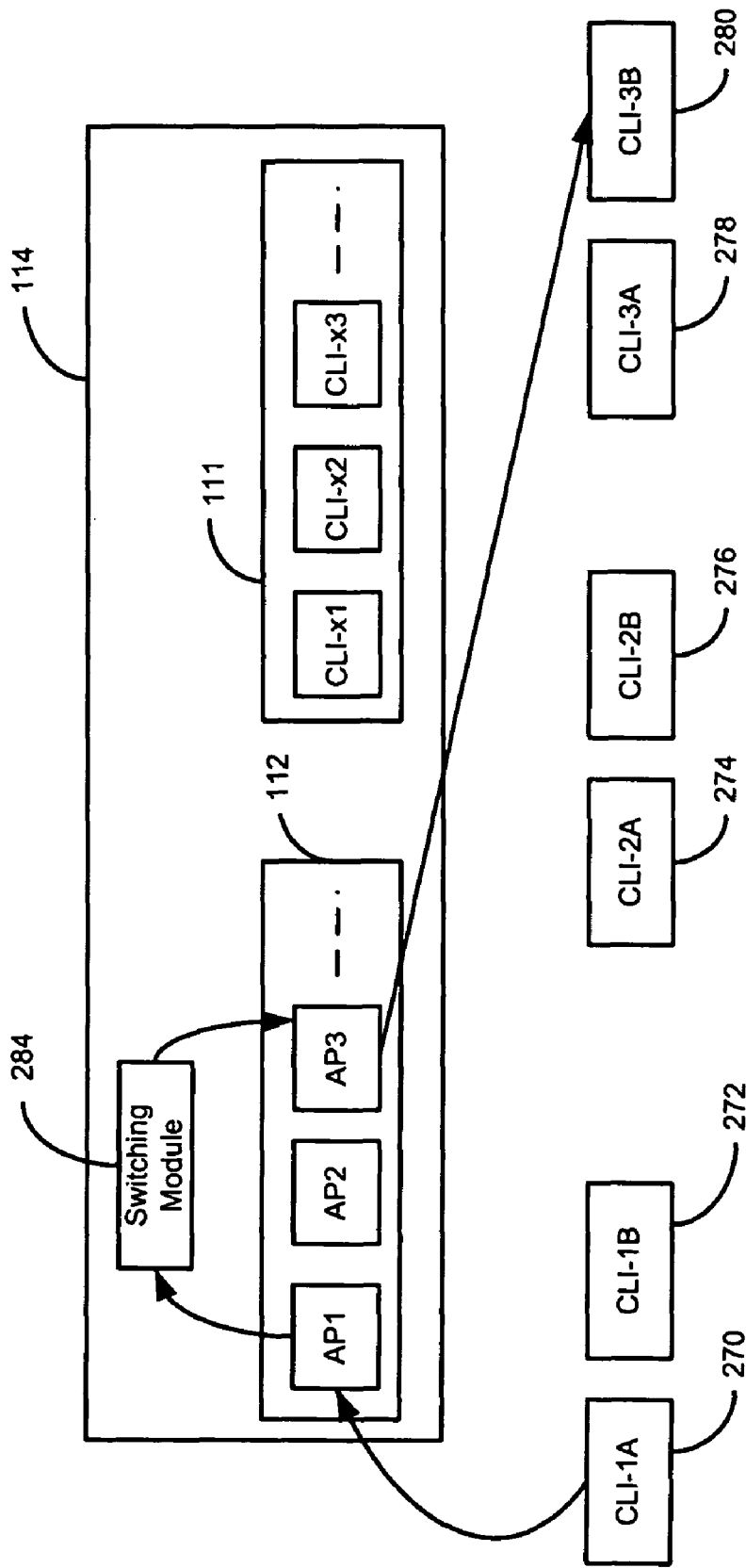
FIG. 11C shows an exemplary communication between a client station in one basic service set and a client station in another basic service set according to the present invention.
Figure 11D:
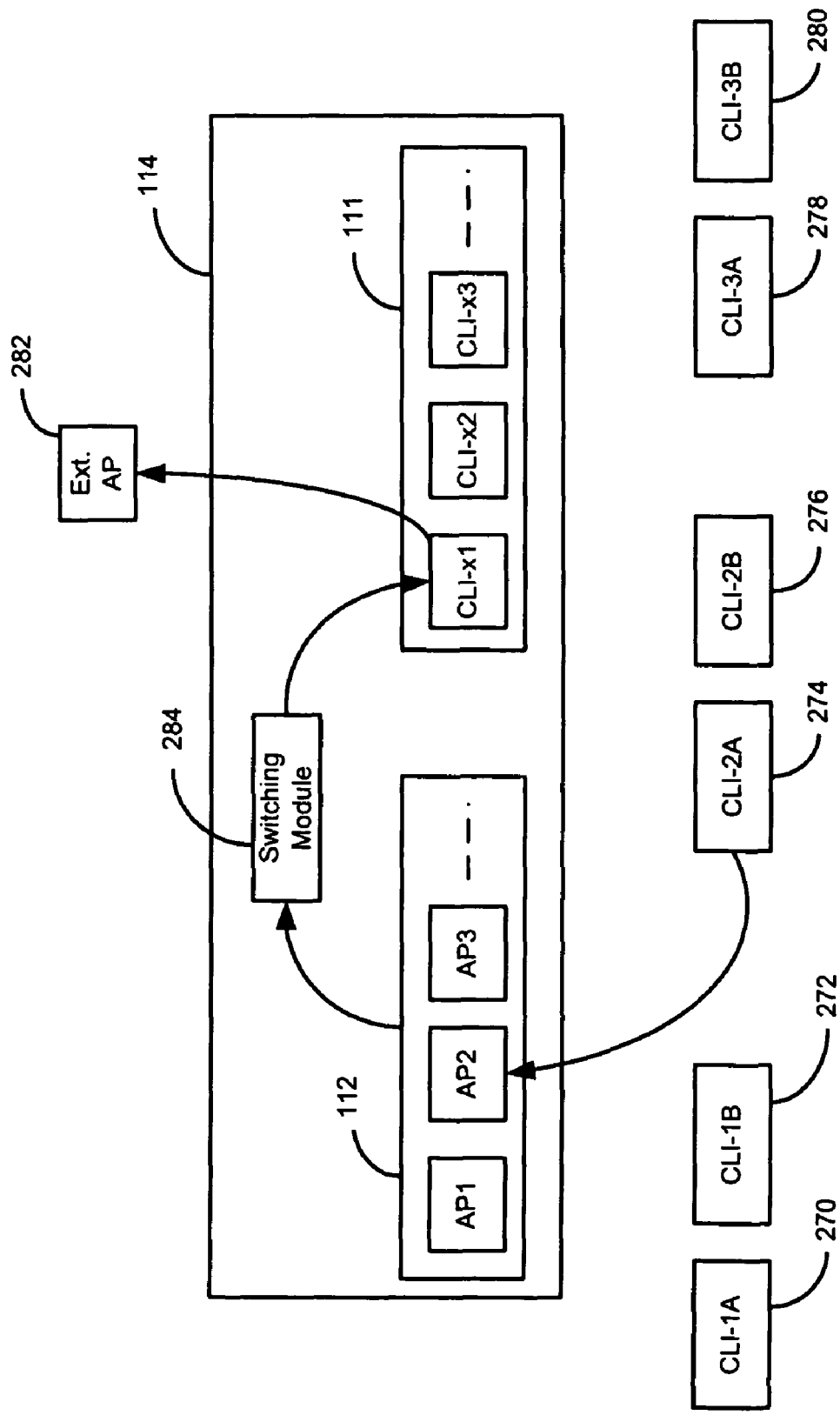
FIG. 11D shows an exemplary communication between a client station in one basic service set and an access point in another basic service set according to the present invention.

Referring now to FIGS. 11B-11D, various exemplary traffic-flows according to the present invention are shown. Although the traffic-flows are shown in one direction, they may similarly occur in an opposite direction. As shown in FIG. 11B, client station CLI-1A 272 may communicate with client station CLI-1B 274 via associated AP1 112. When the multi-access point device 114 receives a frame from CLI-1A 272 that has a destination MAC address of CLI-1B 274, the multi-access point device 114 routes that frame to CLI-1B via AP1 112.

As shown in FIG. 11B, client station CLI-1A 272 in one BSS may communicate with client station CLI-3B 280 in another BSS. The multi-access point device 114 receives a frame from CLI-1A 272 via associated AP1 112. The switching module 284 determines if the destination MAC address of CLI-3B 280 in the frame matches an entry in the connection table 285. Accordingly, the multi-access point device 114 routes the frame to CLI-3B 280 via AP3 112.

As shown in FIG. 11D, client station CLI-2A 274 in one BSS may communicate with the external AP 282. The multi-access point device 114 receives a frame from CLI-2A 274 via associated AP2 112. The switching module 284 determines if the destination MAC address in the frame matches an entry in the connection table 285. Accordingly, the multi-access point device 114 routes the frame to AP 282 via CLI-1. That is, the multi-access point device 114 communicates as CLI-1 and transmits the frame to AP 282.

Referring now to FIGS. 12A-12B, two exemplary implementations of the present invention are shown. As shown in FIG. 12A, the present invention can be implemented in a set top box 480. The present invention may be implemented in either or both signal processing and/or control circuits that are generally identified in FIG. 12A at 482, and a WLAN network interface 496 of the set top box 480.

The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices such as hard disk drives HDD and/or DVDs. The HDD may be a mini HDD that includes one or more platters having a diameter that is smaller than approximately 1.8".

The set top box 480 may be connected to memory 494 such as RAM, ROM, low latency nonvolatile memory such as flash memory and/or other suitable electronic data storage. The set top box 480 also may support connections with a WLAN via the WLAN network interface 496.

Referring now to FIG. 12B, the present invention can be implemented in a media player 500. The present invention may be implemented in either or both signal processing and/or control circuits that are generally identified in FIG. 12B at 504, and a WLAN network interface 516 of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508.

The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices such as hard disk drives HDD and/or DVDs. The HDD may be a mini HDD that includes one or more platters having a diameter that is smaller than approximately 1.8".

The media player 500 may be connected to memory 514 such as RAM, ROM, low latency nonvolatile memory such as flash memory and/or other suitable electronic data storage. The media player 500 also may support connections with a WLAN via the WLAN network interface 516. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification, and the following claims.

What is claimed is:

1. A wireless network device, comprising:
   N access point (AP) modules having N BSSID's, where N is an integer greater than 1; and
   a control module that communicates with said N AP modules, that stores said N BSSID's, a BSSID of an $(N+1)^{th}$ external AP that communicates with M client stations, and at least one MAC address of at least one of said M client stations, where M is an integer greater than or equal to 1, and that communicates with said $(N+1)^{th}$ external AP by emulating said at least one of said M client stations.

2. The wireless network device of claim 1 wherein said control module receives a frame from a client station that communicates with one of said N AP modules, and selectively transmits said frame to said $(N+1)^{th}$ external AP based on data in said frame, said N BSSID's, said BSSID of said $(N+1)^{th}$ external AP, and said at least one MAC address of at least one of said M client stations, wherein said wireless network device communicates with said $(N+1)^{th}$ external AP as said at least one of said M client stations.

3. The wireless network device of claim 2 wherein said control module transmits said frame to a client station that communicates with one of said N AP modules based on data in said frame, said N BSSID's, said BSSID of said $(N+1)^{th}$ external AP, and said at least one MAC address of at least one of said M client stations.

4. The wireless network device of claim 1 wherein said control module receives a frame from said $(N+1)^{th}$ external AP and transmits said frame to a client station that communicates with one of said N AP modules based on data in said frame, said N BSSID's, said BSSID of said $(N+1)^{th}$ external AP, and said at least one MAC address of at least one of said M client stations, wherein said wireless network device communicates with said $(N+1)^{th}$ external AP as said at least one of said M client stations.

5. The wireless network device of claim 1 further comprising a baseband processor that communicates with said N AP modules and said control module.

6. The wireless network device of claim 5 further comprising a radio frequency (RF) transceiver that communicates with said baseband processor.

7. The wireless network device of claim 1 wherein said control module comprises a transmit module that generates a plurality of target beacon transmission time (TBTT) pulse trains based on predetermined beacon intervals and predetermined DTIM periods.

8. The wireless network device of claim 7 wherein said TBTT pulse trains trigger said N AP modules that transmit beacons having beacon intervals proportional to N.

9. The wireless network device of claim 8 wherein said beacons are staggered and non-overlapping.

10. The wireless network device of claim 1 wherein said control module comprises a receive module that receives frames, compares MAC addresses in said frames with said N BSSID's, said BSSID of said $(N+1)^{th}$ external AP, and said at least one MAC address of at least one of said M client stations, and selectively routes said frames to one of one of said N AP modules and said at least one of said M client stations.

11. A method, comprising:
    associating N BSSID's with N access points (AP's), an $(N+1)^{th}$ BSSID with an external AP that communicates with M client stations, and at least one MAC address of at least one of said M client stations with at least one of said M client stations, where M is an integer greater than or equal to 1;
    communicating with a client station associated with at least one of said N AP's using at least one of said N BSSID's; and
    selectively communicating with said external AP by emulating at least one of said M client stations.

12. The method of claim 11 further comprising:
    emulating at least one of said N AP's;
    receiving a frame from a client station that communicates with one of said N AP's; and
    selectively transmitting said frame to said external AP by emulating said at least one of said M client stations based on data in said frame, said N BSSID's, said $(N+1)^{th}$ BSSID, and said at least one MAC address of at least one of said M client stations.

13. The method of claim 12 further comprising:
    emulating at least one of said N AP's; and
    transmitting said frame to a client station that communicates with one of said N AP's based on data in said frame, said N BSSID's, said $(N+1)^{th}$ BSSID, and said at least one MAC address of at least one of said M client stations.

14. The method of claim 11 further comprising:
    receiving a frame from said external AP by emulating at least one of said M client stations;
    emulating at least one of said N AP's; and
    transmitting said frame to a client station that communicates with one of said N AP's based on data in said frame, said N BSSID's, said $(N+1)^{th}$ BSSID, and said at least one MAC address of at least one of said M client stations.

15. The method of claim 11 further comprising communicating via one baseband processor when emulating at least one of said N AP's and said at least one of said M client stations.

16. The method of claim 15 further comprising communicating via one radio frequency (RF) transceiver when emulating at least one of said N AP's and said at least one of said M client stations.

17. The method of claim 11 further comprising generating a plurality of target beacon transmission time (TBTT) pulse trains based on predetermined beacon intervals and predetermined DTIM periods.

18. The method of claim 17 further comprising triggering said N AP's based on said TBTT pulse trains and transmitting beacons having beacon intervals proportional to N.

19. The method of claim 18 further comprising transmitting said beacons that are staggered and non-overlapping.

20. The method of claim 11 further comprising:
receiving frames;
comparing MAC addresses in said frames with said N BSSID's, said $(N+1)^{th}$ BSSID, and said at least one MAC address of at least one of said M client stations; and
selectively routing said frames to one of one of said N AP's and said at least one of said M client stations.

21. A wireless network device, comprising:
N access point (AP) modules having N BSSID's, where N is an integer greater than 1; and
control means for communicating with said N AP modules, storing said N BSSID's, a BSSID of an $(N+1)^{th}$ external AP that communicates with M client stations, and at least one MAC address of at least one of said M client stations, where M is an integer greater than or equal to 1, and communicating with said $(N+1)^{th}$ external AP by emulating said at least one of said M client stations.

22. The wireless network device of claim 21 wherein said control means receives a frame from a client station that communicates with one of said N AP modules, and selectively transmits said frame to said $(N+1)^{th}$ external AP based on data in said frame, said N BSSID's, said BSSID of said $(N+1)^{th}$ external AP, and said at least one MAC address of at least one of said M client stations, wherein said wireless network device communicates with said $(N+1)^{th}$ external AP as said at least one of said M client stations.

23. The wireless network device of claim 22 wherein said control means transmits said frame to a client station that communicates with one of said N AP modules based on data in said frame, said N BSSID's, said BSSID of said $(N+1)^{th}$ external AP, and said at least one MAC address of at least one of said M client stations.

24. The wireless network device of claim 21 wherein said control means receives a frame from said $(N+1)^{th}$ external AP and transmits said frame to a client station that communicates with one of said N AP modules based on data in said frame, said N BSSID's, said BSSID of said $(N+1)^{th}$ external AP, and said at least one MAC address of at least one of said M client stations, wherein said wireless network device communicates with said $(N+1)^{th}$ external AP as said at least one of said M client stations.

25. The wireless network device of claim 21 further comprising baseband processor means for communicating with said N AP modules and said control means.

26. The wireless network device of claim 25 further comprising radio frequency (RF) transceiver means for communicating with said baseband processor means.

27. The wireless network device of claim 21 wherein said control means comprises transmit means for generating a plurality of target beacon transmission time (TBTT) pulse trains based on predetermined beacon intervals and predetermined DTIM periods.

28. The wireless network device of claim 27 wherein said TBTT pulse trains trigger said N AP modules that transmit beacons having beacon intervals proportional to N.

29. The wireless network device of claim 28 wherein said beacons are staggered and non-overlapping.

30. The wireless network device of claim 21 wherein said control means comprises receive means for receiving frames, comparing MAC addresses in said frames with said N BSSID's, said BSSID of said $(N+1)^{th}$ external AP, and said at least one MAC address of at least one of said M client stations, and selectively routing said frames to one of one of said N AP modules and said at least one of said M client stations.

31. A computer program stored in a memory and executed by a processor, comprising:
associating N BSSID's with N access points (AP's), an $(N+1)^{th}$ BSSID with an external AP that communicates with M client stations, and at least one MAC address of at least one of said M client stations with at least one of said M client stations, where M is an integer greater than or equal to 1;
communicating with a client station associated with at least one of said N AP's using at least one of said N BSSID's; and
selectively communicating with said external AP by emulating at least one of said M client stations.

32. The computer program of claim 31 further comprising:
emulating at least one of said N AP's;
receiving a frame from a client station that communicates with one of said N AP's; and
selectively transmitting said frame to said external AP by emulating said at least one of said M client stations based on data in said frame, said N BSSID's, said $(N+1)^{th}$ BSSID, and said at least one MAC address of at least one of said M client stations.

33. The computer program of claim 32 further comprising:
emulating at least one of said N AP's; and
transmitting said frame to a client station that communicates with one of said N AP's based on data in said frame, said N BSSID's, said $(N+1)^{th}$ BSSID, and said at least one MAC address of at least one of said M client stations.

34. The computer program of claim 31 further comprising:
receiving a frame from said external AP by emulating at least one of said M client stations;
emulating at least one of said N AP's; and
transmitting said frame to a client station that communicates with one of said N AP's based on data in said frame, said N BSSID's, said $(N+1)^{th}$ BSSID, and said at least one MAC address of at least one of said M client stations.

35. The computer program of claim 31 further comprising communicating via one baseband processor when emulating at least one of said N AP's and said at least one of said M client stations.

36. The computer program of claim 35 further comprising communicating via one radio frequency (RF) transceiver when emulating at least one of said N AP's and said at least one of said M client stations.

37. The computer program of claim 31 further comprising generating a plurality of target beacon transmission time (TBTT) pulse trains based on predetermined beacon intervals and predetermined DTIM periods.

38. The computer program of claim 37 further comprising triggering said N AP's based on said TBTT pulse trains and transmitting beacons having beacon intervals proportional to N.

39. The computer program of claim 38 further comprising transmitting said beacons that are staggered and non-overlapping.

40. The computer program of claim 31 further comprising:
receiving frames;
comparing MAC addresses in said frames with said N BSSID's, said $(N+1)^{th}$ BSSID, and said at least one MAC address of at least one of said M client stations; and
selectively routing said frames to one of one of said N AP's and said at least one of said M client stations.

\* \* \* \* \*